(12) United States Patent
Asakura

(10) Patent No.: US 6,661,751 B2
(45) Date of Patent: Dec. 9, 2003

(54) TRACK-FOLLOWING METHOD IN OPTICAL DISC APPARATUS AND OPTICAL DISC APPARATUS ADOPTING THIS METHOD

(75) Inventor: Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 09/984,710

(22) Filed: Oct. 31, 2001

(65) Prior Publication Data

US 2002/0051411 A1 May 2, 2002

(30) Foreign Application Priority Data

Oct. 31, 2000 (JP) ........................................ 2000-333581

(51) Int. Cl.[7] ................................................. G11B 7/00
(52) U.S. Cl. ................................. 369/44.27; 369/44.26; 369/275.4
(58) Field of Search ........................... 369/44.27, 44.28, 369/44.29, 44.34, 44.35, 44.26, 44.25, 47.1, 53.1, 53.28, 275.1, 275.4

(56) References Cited

U.S. PATENT DOCUMENTS 6,459,661 B1 * 10/2002 Iwanaga ................... 369/44.26
6,545,972 B1 * 4/2003 Kato et al. ............. 369/124.12

* cited by examiner

Primary Examiner—Muhammad Edun

(57) ABSTRACT

In a track-following method in a DVD-RAM disc, CAPA detection is avoided during the track-following process, and a track-following operation is stably made from a high-speed state using adaptive deceleration pulses. In order to avoid CAPA detection during the track-following process, a CAPA is detected from a tracking error signal using a high-pass filter, and the track-following start timing is set within 0.4 ms after the detection of the CAPA. The pulse width of the adaptive deceleration pulses to a lens actuator is variable so that the tracking error signal follows a standard tracking error signal. The zero-crossing point of the tracking error signal after the detection of the CAPA is set as the track-following start timing, and tracking-servo is started after an adaptive brake process for varying the deceleration pulse width based on the difference between the tracking error signal and standard tracking error (TE) signal.

16 Claims, 12 Drawing Sheets

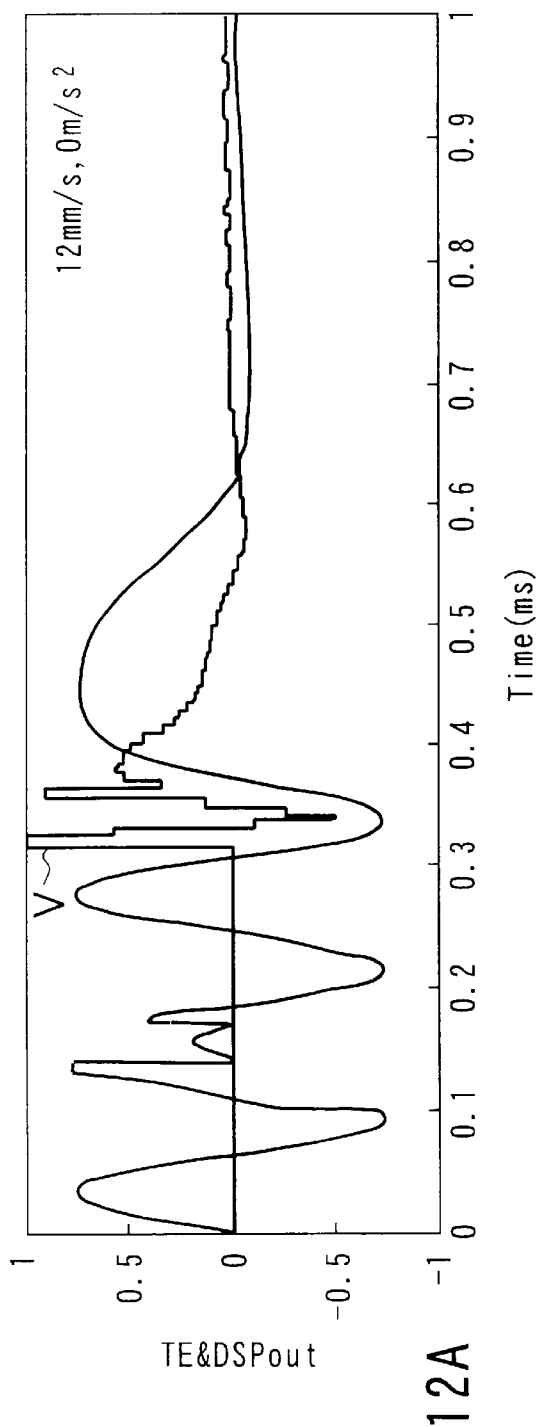
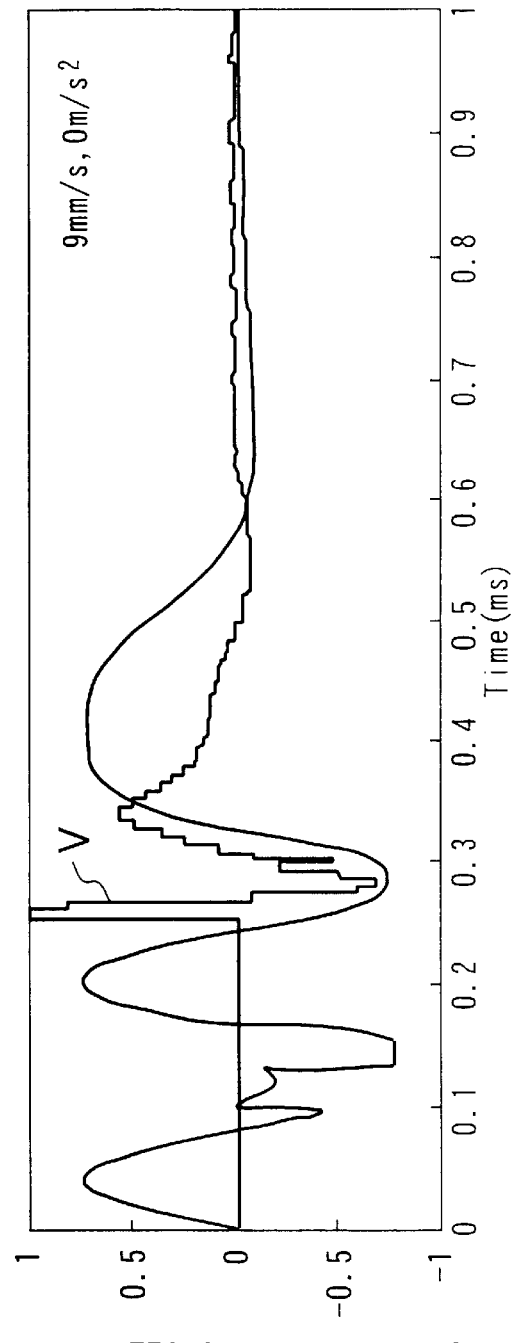
FIG. 12A
FIG. 12B

TRACK-FOLLOWING METHOD IN OPTICAL DISC APPARATUS AND OPTICAL DISC APPARATUS ADOPTING THIS METHOD

CROSS-REFERENCE TO RELATED APPLICATIONS

This application is based upon and claims the benefit of priority from the prior Japanese Patent Application No. 2000-333581, filed Oct. 31, 2000, the entire contents of which are incorporated herein by reference.

BACKGROUND OF THE INVENTION

1. Field of the Invention

The present invention relates to a track-following method in an optical disc apparatus and an optical disc apparatus that adopts this method and, more particularly, to a method of moving an optical pickup to seek a target track and guiding a light beam spot to the center of the track upon tracking the target track on an optical disc in an optical disc apparatus that can record data on an optical disc such as a DVD-RAM disc which has a header field having staggered pre-pits (so-called CAPA), and an optical disc apparatus that adopts this method.

2. Description of the Related Art

In recent years, specifications of a DVD-RAM (Digital Versatile Disc of Random Access Memory Type) disc as an optical disc have been provided. This DVD-RAM disc is provided with a phase-change type recording layer that allows overwrite, and adopts a single-track format. In the single-track format, data can be recorded not only on grooves but also on lands between neighboring grooves for the purpose of increasing the recording capacity, and in which a land and groove alternately appear per round. Therefore, since a recording track continues from a land to a groove, and then from a groove to a land, data can be continuously recorded. Since the DVD-RAM disc adopts a scheme for recording marks on lands and grooves, crosstalk is suppressed by adjusting the groove depth. That is, each groove is formed to have a predetermined depth (60 to 70 nm) so as to obtain an identical reflection intensity from a track independently of the presence/absence of marks on a neighboring track.

Furthermore, in the DVD-RAM disc, the track is segmented into a plurality of sectors, each of which has a header field, data recording field, and mirror fields located between these two fields. The header field located at the head of a sector has an embossed header formed by pre-pits, where fields PID1 to PID4 are formed by writing ID (identification data) four times. The fields PID1 and PID2, and fields PID3 and PID4, are offset to the left and right with respect to the center of the track. The left and right offset fields PID1 and PID2 and fields PID3 and PID4 are called CAPA (Complementary Allocated Pit Address).

It is very important for an optical disc apparatus that drives an optical disc such as the DVD-RAM disc to improve seek performance for seeking a target track. The optical disc apparatus has a track access mechanism for accessing a target track, and this track access mechanism normally uses two stages of mechanisms, i.e., coarse movement and fine movement. A seek sequence is executed in the order of coarse seek, center guide 1, fine seek, and center guide 2. Note that the track-following process is a control process for setting the relative speed between the disc and light beam spot formed on the disc in the radial direction of the disc to be zero, and setting the beam spot coming from an objective lens at the track central position, and relative motion between the disc and light beam spot is detected by a tracking error signal (T SUB signal) which is also called a tracking error signal (TE signal).

It is not so easy to realize a stable track-following process of the objective lens since the track-following process depends on the actuator sensitivity of a lens fine movement system, and the tracking error (TE) signal has nonlinear periodicity. For example, even when tracking-servo is suddenly started in the vicinity of a target track, since the deceleration performance of a lens actuator is limited, a track-following failure such as "tracking-servo failure" (the lens fine movement system repeats acceleration/deceleration) may occur.

As a method of realizing a stable track-following process, various devises are proposed. For example, in a DVD-ROM drive or the like, a so-called "hysteresis track-following" scheme for executing a hysteresis process of a tracking error (TE) signal on the basis of a track sum signal having a 90° phase difference from the tracking error (TE) signal to attain a stable track-following process is known, and this scheme is adopted.

Since the DVD-RAM disc adopts land-and-groove recording, the groove depth is determined to obtain equal amounts of light reflected from the land and groove and, hence, a sum signal having a 90° phase difference from the tracking error (TE) signal cannot be generated. As a result, the "hysteresis track-following" scheme cannot be applied to the DVD-RAM disc.

The DVD-RAM disc has pre-pits called CAPA, as described above, and upon detecting the CAPA before the end of track-following, noise is produced in the tracking error (TE) signal due to the CAPA, and the track-following process of the DVD-RAM disc drive becomes unstable.

In the conventional track-following process of the DVD-RAM disc drive, the control waits until the relative speed between the disc and lens becomes sufficiently small, e.g., until it is confirmed that the relative speed becomes 7 mm/s or less, and then switches to tracking-servo. However, the wait time required until the relative speed between the disc and light beam spot becomes sufficiently small disturbs a decrease in seek time.

As a processing method that allows to guide the beam spot to the center of a track even when the relative speed between the disc and light beam spot becomes higher than the current upper limit, a method of decelerating the lens using brake pulses may be used. In the brake pulse deceleration method, when the phase of a tracking error signal has been reached, maximum pulses are supplied to the lens fine movement driving system for a predetermined period of time so as to reduce the relative speed, thus achieving a nearly zero relative speed state near the center of a track within the shortest time, and tracking-servo is then started. As the control system, since the relative speed is abruptly decreased by an open lens actuator command, the track-following process can be done even when the relative speed is high at the beginning of tracking-servo. In this case, if relative motion (relative acceleration, relative speed, relative position) is constant at the beginning of tracking-servo, no problem is posed. However, if relative motion is not constant at the beginning of the track-following process, the light beam spot cannot be stably guided to the center of a track.

FIGS. 1A and 1B show the time responses of a track-following command to a lens actuator and a tracking error (TE) signal upon guiding a light beam spot to the center of a given track by the method of decelerating the lens using brake pulses. In FIGS. 1A and 1B, reference symbol I denotes a tracking error (TE) signal; and II, an output (DSPout) from a digital signal processor (DSP). FIG. 1A shows a case wherein the initial thrust speed of the lens is 14 mm/s, and the acceleration is zero (0 m/S$^2$). In this example, brake pulses are generated before an elapse of time "0.3 ms", and tracking-servo is then started to make the tracking error (TE) signal converge to zero. In the example shown in FIG. 1A, the light beam spot is reliably guided to the center of the target track. By contrast, FIG. 1B shows a case wherein the initial thrust speed of the lens is 9 mm/s smaller than 14 mm/s, and the acceleration is zero (0 m/S$^2$). In this example, brake pulses are generated after an elapse of time "0.25 ms", and tracking-servo is then started. However, the tracking error (TE) signal cannot be converged to zero, and the light beam spot cannot be guided to the center of the target track, thus producing so-called "tracking-servo failure".

As can be seen from FIGS. 1A and 1B, the method of decelerating the lens by brake pulses can successfully guide the light beam spot to the center of a track but may cause "tracking-servo failure" depending on the speed at the beginning of tracking-servo. That is, the method of decelerating the lens by brake pulses has a narrow allowable range of the initial thrust speed, and thrust at low speed falling outside this allowable range causes "tracking-servo failure". Although not shown, even within a range that allows a track-following process, if a light beam spot crosses CAPA immediately after tracking-servo is started, the servo system becomes unstable, and the track-following process fails. In any case, a sufficiently stable track-following process cannot be realized by only the brake pulse deceleration method.

As described above, in the track-following process in the conventional DVD-RAM disc drive, the track-following process must be started after the relative speed between the disc and light beam spot becomes considerably low so as to attain a stable track-following process, and such wait time disturbs a decrease in seek time. Even by the brake pulse deceleration method that can attain a track-following process even at a high relative speed between the disc and light beam spot, a sufficiently stable track-following process cannot be realized.

BRIEF SUMMARY OF THE INVENTION

It is an object of the present invention to provide a track-following method in an optical disc apparatus that can stably guide a light beam spot to the center of a target track even when an objective lens crosses a track at a higher relative speed in an optical disc apparatus for driving a disc having CAPA such as a DVD-RAM disc, and an optical disc apparatus which adopts this method.

According to an aspect of the present invention, there is provided a method of guiding an optical beam on a target track on an optical disc having lands and grooves defining tracks, each of the tracks including sectors having header regions in which pre-pits are formed, comprising:

moving the light beam in a direction to cross the tracks to seek the target track on the optical disc;

detecting the light beam reflected from the optical disc to generate a tracking error signal having zero-crossing points;

detecting the pre-pits from the tracking error signal, and detecting a predetermined one of the zero-crossing points after the detection of the pre-pits to generate a start signal; and starting tracking-servo in response to the start signal to guide the optical beam on the target track in accordance with the tracking error signal.

According to an another aspect of the present invention, there is provided an optical disc apparatus configured to guide an optical beam on a target track on an optical disc having lands and grooves defining tracks, each of the tracks including sectors having header regions in which pre-pits are formed comprising:

a focusing lens configured to focus the light beam on the optical disc;

moving mechanism configured to move the focusing lens and shift the light beam in a direction to cross the tracks to seek a target track on an optical disc;

detecting circuit configured to detect the light beam reflected from the optical disc to generate a tracking error signal having zero-crossing points;

pre-pit detecting circuit configure to detect the pre-pits from the tracking error signal, and detecting a predetermined one of the zero-crossing points after the detection of the pre-pits to generate a start signal; and track-servo controller configured to start tracking-servo in response to the start signal to guide the optical beam on the target track in accordance with the tracking error signal.

BRIEF DESCRIPTION OF THE SEVERAL VIEWS OF THE DRAWING

FIGS. 12A and 12B are also graphs showing the relationship between a tracking actuator command S5 (DSPout in the graphs) having a controlled variable u, and a tracking error (TE) when the thrust speed of an objective lens has changed to 12 mm/s and 9 mm/s in the track-following control system shown in FIG. 7;

DETAILED DESCRIPTION OF THE INVENTION

A track-following method in an optical disc apparatus according to an embodiment of the present invention will be described below with reference to the accompanying drawings.

Figure 1A:
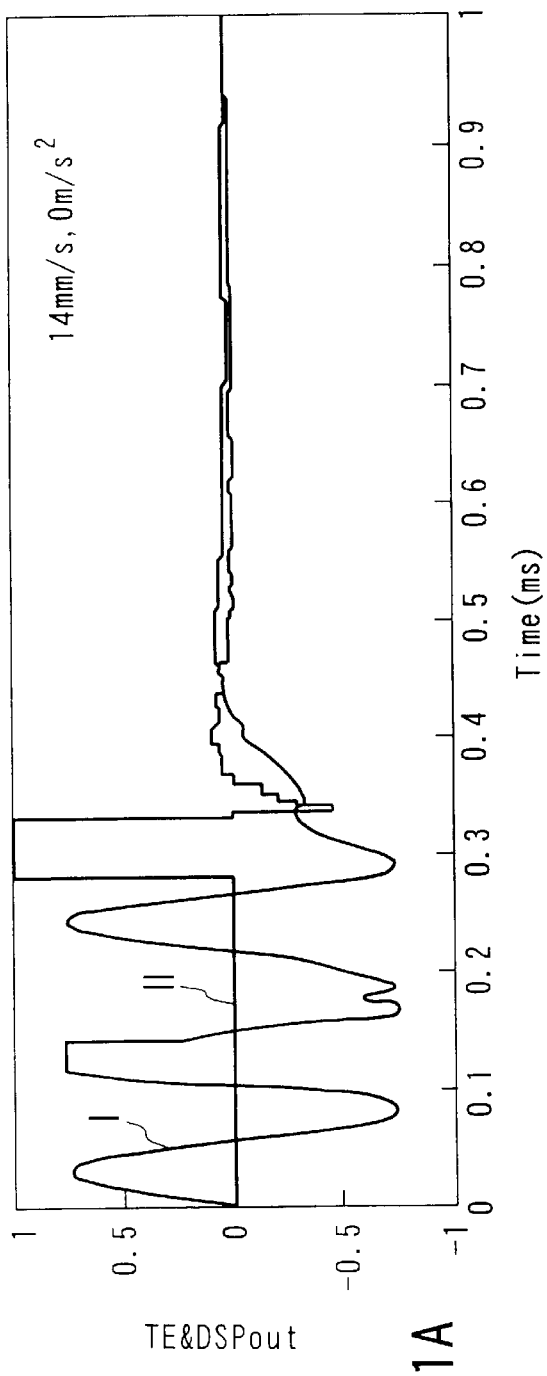
FIGS. 1A and 1B are graphs showing the time responses of a track-following command (DSPout) to a lens actuator and a tracking error (TE) signal upon executing a track-following process of an objective lens to a track by a conventional method of decelerating the lens using brake pulses.
Figure 1B:
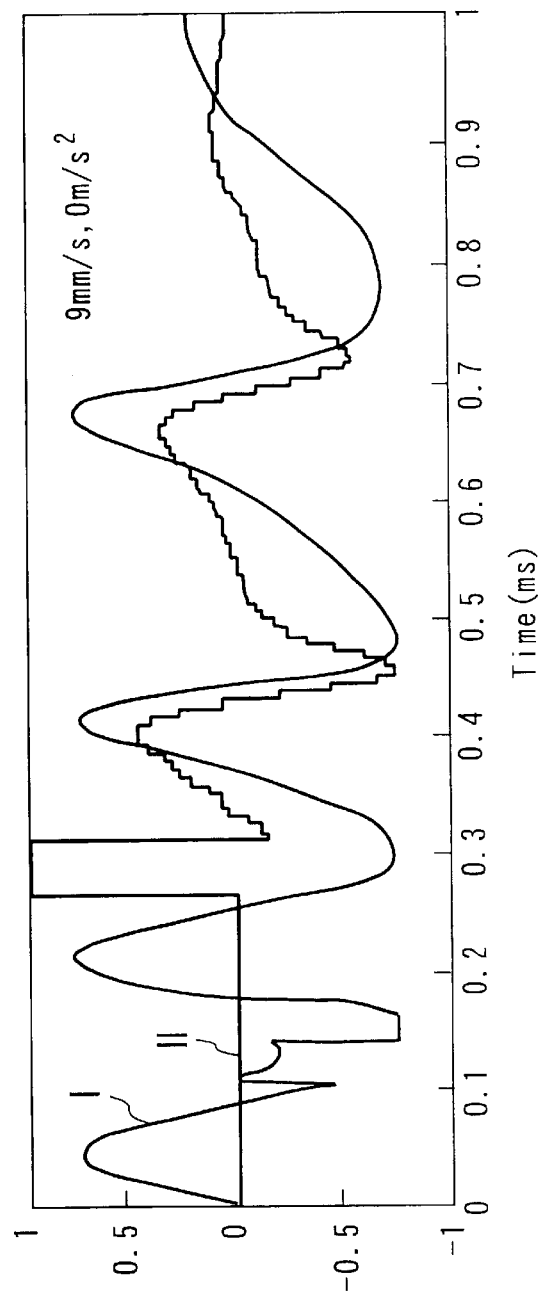
Figure 2:
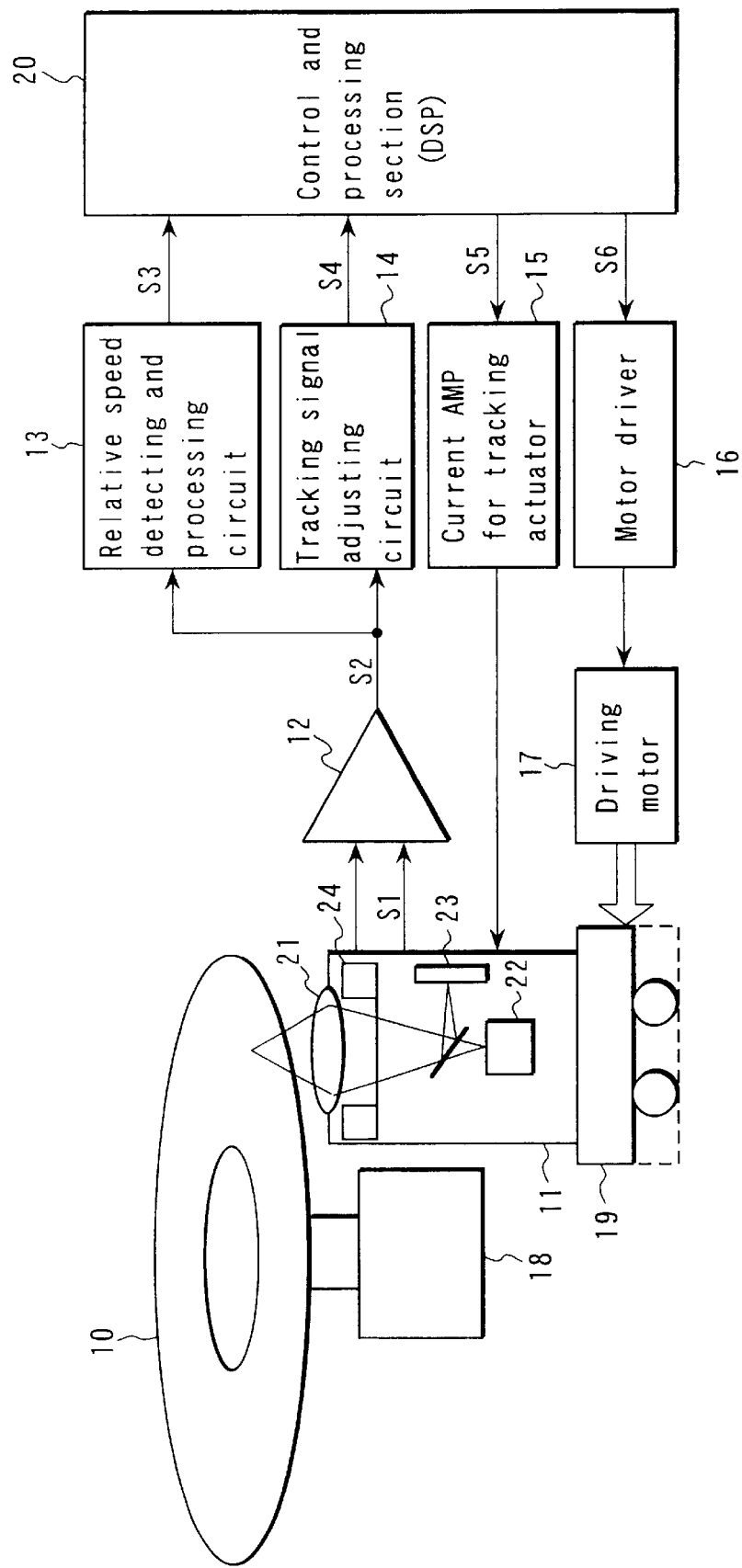
FIG. 2 is a schematic block diagram of an optical disc apparatus for driving a DVD-RAM disc to which a track-following method of the present invention is applied.

FIG. 2 is a schematic block diagram showing an optical disc apparatus to which a track-following method according to an embodiment of the present invention is applied, e.g., a disc drive for driving a DVD-RAM disc. Referring to FIG. 2, reference numeral 10 denotes a DVD-RAM disc. The DVD-R M disc 10 adopts a single track format shown in FIG. 3. That is, a land between tracks k–4 and k–2, which are defined by grooves, is defined as a track k–3. Likewise, a land between tracks k–2 and k, which are defined by grooves, is defined as a track k–1. Also, lands between neighboring grooves are defined as tracks, and marks can be recorded on tracks defined by grooves and lands. In addition, since lands and grooves alternately appear per round, and a recording track continues from a land to groove and from that groove to another land, data can be continuously recorded from tracks k–4 to k+1. As described above, since this DVD-RAM disc adopts a scheme for recording marks on lands and grooves, the groove depth is adjusted to suppress crosstalk. That is, each groove is formed to have a predetermined depth (60 to 70 nm) so as to obtain an identical reflection intensity from a track independently of the presence/absence of marks on a neighboring track.

Figure 3:
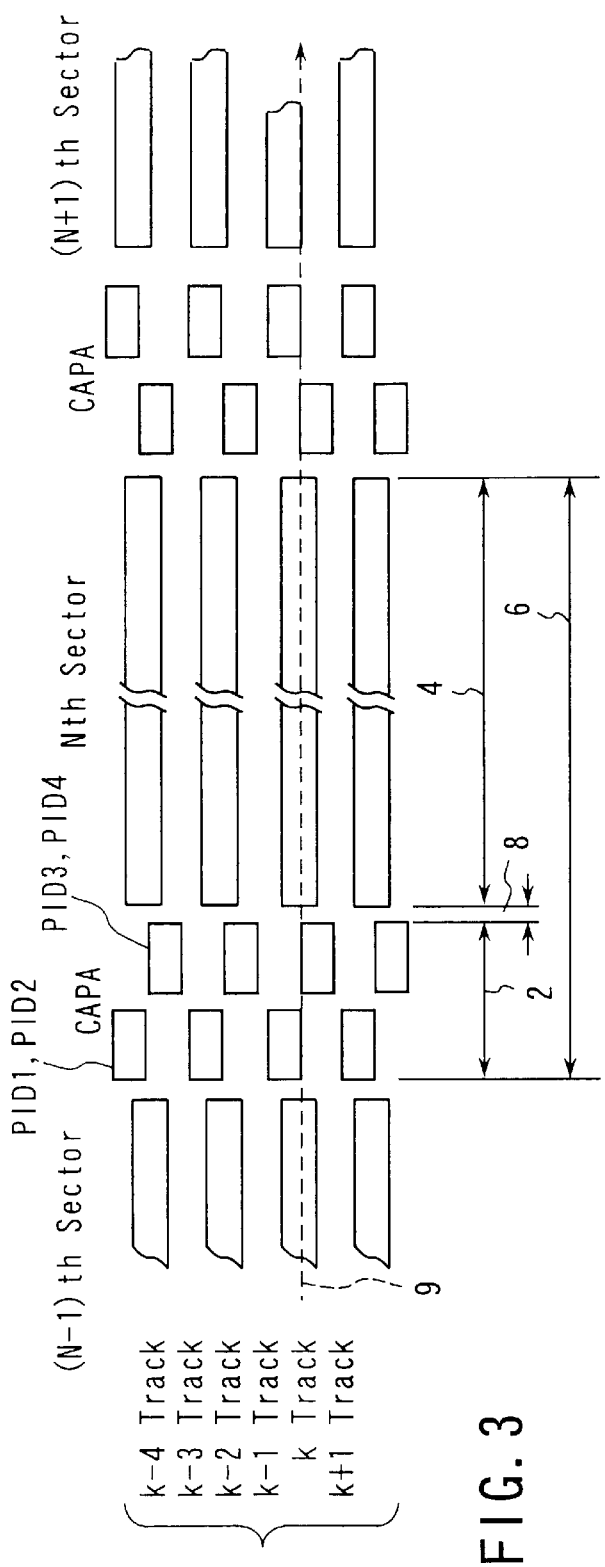
FIG. 3 is a schematic plan view showing a track layout in the DVD-RAM disc shown in FIG. 2.

As shown in FIG. 3, in the DVD-RAM disc, each track is segmented into a plurality of sectors. As shown in FIG. 3, each sector 6, e.g., an N-th sector 6 has a header field 2, data recording field 4, and mirror field 8 assured between the fields 2 and 4. The header field 2 located at the head of the sector 6 has an embossed header formed by pre-pits, where ID (Identification Data) is written four times as PID1 to PID4. Note that the fields where the PID1 to PID4 are written are called CAPA (Complementary Allocated Pit Address), and the fields PID1 and PID2, and fields PID3 and PID4, are offset to the left and right with respect to a center 9 of the track.

As shown in FIG. 2, the DVD-RAM disc 10 is rotatably held by a spindle motor 18, and an optical pickup 11 which comprises an objective lens 21 for focusing a light beam on the rotating DVD-RAM disc 10 opposes the DVD-RAM disc 10. The optical pickup 11 comprises a light source optical system 22 including a semiconductor laser for emitting a light beam, and an optical system for deflecting the light beam toward the objective lens 21, and a detector 23 to which a light beam reflected from the DVD-RAM disc 10 is guided. Furthermore, the optical pickup 11 comprises a lens actuator 24 as a fine movement driving system for finely moving the objective lens 21 to direct a light beam toward a target track.

The optical pickup 11 is moved in a direction to cross a track, i.e., in the radial direction of the disc 10 by a seek driving system which comprises a seek driving mechanism 19 for moving a light beam to seek a target track, and a driving motor 17 for driving the mechanism 19. Coarse seek executed by this seek driving system is not particularly limited. For example, the lens may be moved by only the driving motor 17.

As shown in FIG. 2, a detect signal S1 from the detector 23 is supplied to a differential processing PD (Photo Detector) amplifier 12, which outputs a difference signal of the detect signal S1 as a tracking error signal S2. The tracking error signal S2 output from the differential processing PD (Photo Detector) amplifier 12 is input to a relative speed detecting and processing circuit 13 for detecting the relative speed between the objective lens 21 and disc 10, and generating a relative speed detect signal S3, and a tracking error (TE) signal adjusting circuit 14 for adjusting the tracking error signal S2 and outputting the adjusted signal as a tracking error (TE) signal S4.

The relative speed detect signal S3 from the relative speed detecting and processing circuit 13, and the tracking error (TE) signal S4 from the tracking error (TE) signal adjusting circuit 14 are input to a control and processing section 20, and undergo signal processes, as will be described later. The control and processing section 20 supplies a tracking actuator command S5 and motor speed command to a tracking actuator current amplifier 15 and motor driver 16, respectively. The motor driver 16 drives the motor 17 on the basis of the motor speed command to operate the seek driving mechanism 18, thereby moving the optical pickup 11 so that the light beam spot crosses a track. A driving current from the tracking actuator current amplifier 15 is supplied to the lens actuator 24, which moves the objective lens 21 in response to the driving current. Then, a light beam spot focused via the objective lens 21 is finely moved in a direction to cross a track.

Figure 4:
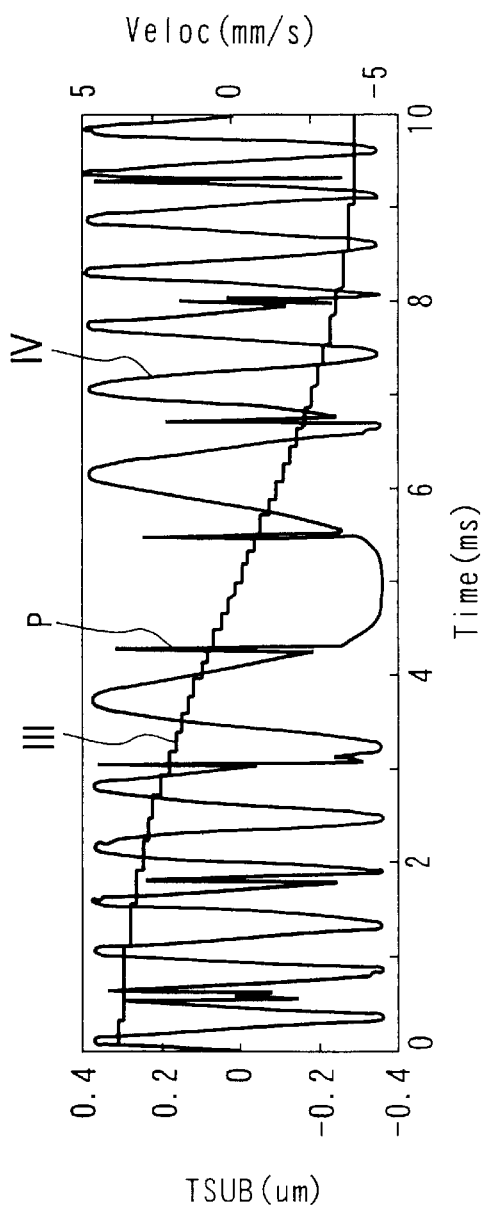
FIG. 4 is a graph showing a tracking error signal (T SUB) generated when a light beam crosses a track on the DVD-RAM disc shown in FIG. 2, and the moving speed of the object lens from which a light beam emerges.

An example of the tracking error signal S2 which is generated by the differential processing PD (Photo Detector) amplifier when a light beam spot seeks on the DVD-RAM disc having the track layout shown in FIG. 3 will be explained with reference to FIG. 4 for the purpose of reference. In the graph shown in FIG. 4, reference symbol III denotes a moving speed of the light beam spot; and IV, a tracking error signal S2. In this example, the speed of the light beam spot is 4 mm/s at time "0 m/s", the objective lens 21 is then decelerated, the moving speed of the light beam spot becomes zero near time "5 ms", and the light beam spot is returned while increasing its moving speed. As can be seen from this graph, the tracking error signal S2 changes in a waveform similar to a sine waveform to have a shorter period as the moving speed of the light beam spot is higher, and a longer period as the moving speed becomes lower. Every time the light beam spot crosses a header field 2 formed with CAPA, the waveform is disturbed and a waveform P having a sharp peak shape appears. A point where the tracking error signal S2 becomes zero is a zero-crossing point, and if feedback control is made to make the tracking error signal S2 converge at the zero-crossing point, the light beam spot is maintained in an on-track state. However, as described in the prior art, since a waveform P having a sharp peak shape appears every time the light beam spot crosses a header field 2 with CAPA, it becomes difficult to guide the light beam spot to the center of a track. In the present invention, as will be described later, a track-following process of the light beam spot is started at the detection timing of a waveform P having a sharp peak shape generated every time the light beam spot crosses a header field 2 with CAPA.

In the system shown in FIG. 2, the relative speed is detected on the basis of the tracking error signal output based on the signal from the detector 23, and the objective lens 21 is controlled to be driven so that the relative speed of the light beam spot with respect to the optical disc 10 becomes equal to a setting speed. Note that the setting speed has undergone a process which obtains the number of offset tracks to a target track from a count value of a cross pulse generated every time the light beam spot crosses a track, and generates a target speed to obtain a low relative speed near the target track. As for the track-following operation, the control and processing section (DSP) 20 shown in FIG. 2 processes a tracking signal to implement the track-following control system shown in FIG. 7.

Figure 6:
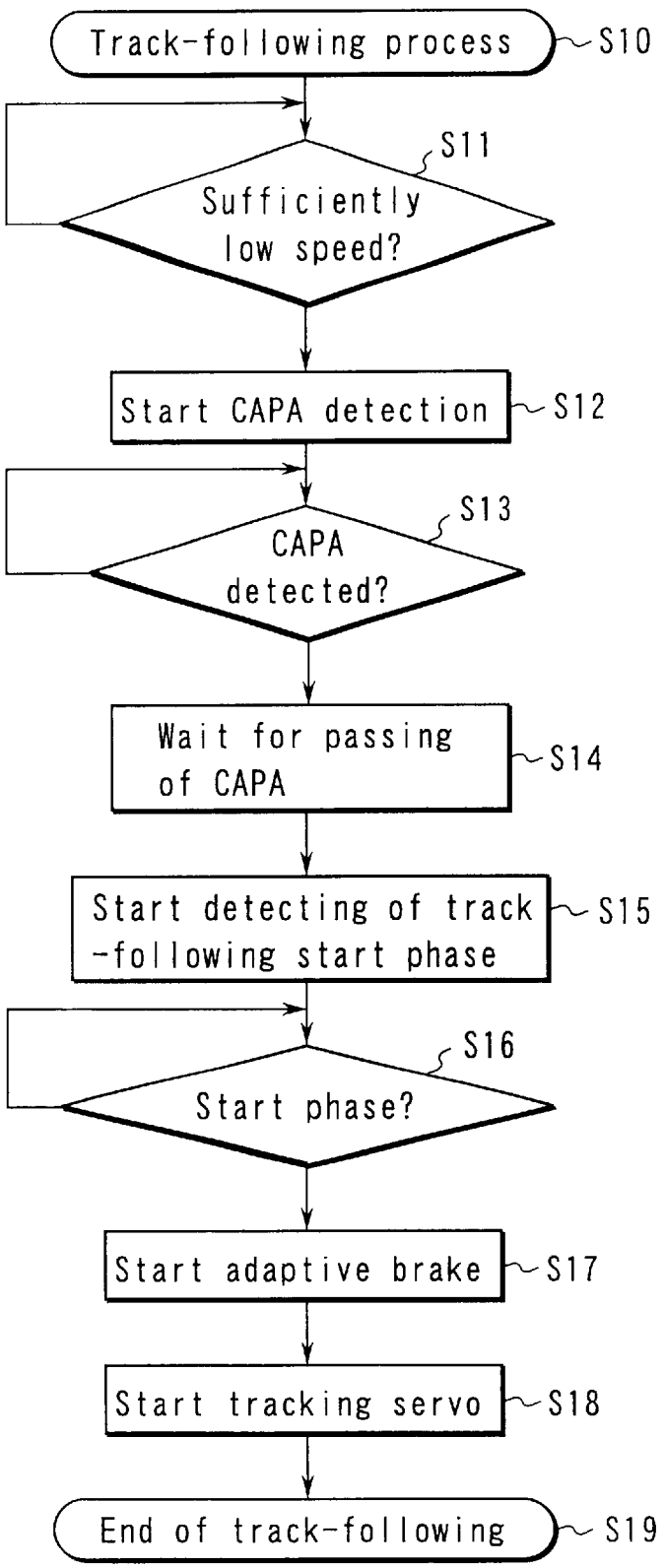
FIG. 6 is a flow chart showing an embodiment of track-following control executed by the control and processing section of the optical disc apparatus shown in FIG. 2.

An embodiment of the track-following process in the system shown in FIG. 2 will be explained below with reference to the flow chart shown in FIG. 6, and the functional block diagram in the control and processing section (DSP) 20 shown in FIG. 7. Note that FIG. 7 shows, as blocks, functions to be processed by software when the control and processing section (DSP) 20 implements the track-following process.

Figure 7:
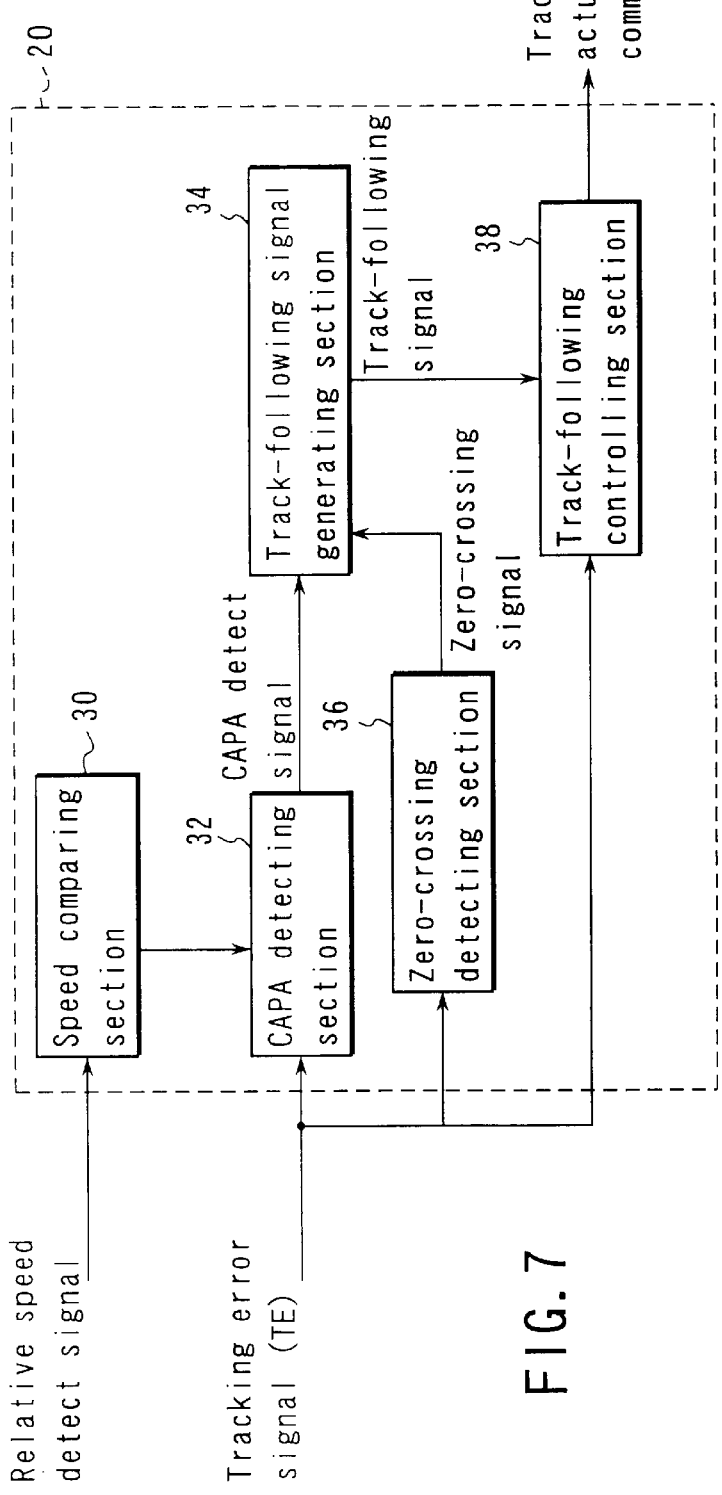
FIG. 7 is a block diagram for explaining functions for track-following control implemented by the control and processing section of the optical disc apparatus shown in FIG. 2 according to an embodiment of the present invention.

In the system shown in FIGS. 2 and 7, a target track is determined, the number of offset tracks to be sought from the current ON track or a home position, and seek starts. When the seek process has started, the control and processing section 20 supplies a motor speed command S6 to the motor driver 16. In response to this motor speed command S6, the motor driver 16 supplies a driving current to the motor 17 to actuate the seek mechanism 19, and to move the optical pickup 11 toward the target track. As a result, the differential processing PD amplifier 12 generates a tracking error signal S2 shown in FIG. 4, and the relative speed detecting and processing circuit 13 generates a relative speed detect signal S3 associated with the seek speed. These signals are supplied to the control and processing section 20. Also, the tracking error signal adjusting circuit 14 generates a tracking error signal S4, which is supplied to the control and processing section 20. The control and processing section 20 counts tracking error signals S4 to decrement the number of offset tracks. When the number of offset tracks falls within a given range, the control and processing section 20 sufficiently decelerates the seek operation of the seek mechanism 19, and then actuates a tracking actuator. When the number of offset tracks further decreases to fall within a range of a predetermined value, and it is determined that the light beam spot position sufficiently becomes close to the vicinity of the target track, the operation of the seek mechanism 19 is stopped, and a process for making the lens actuator 24 position the light beam spot on a track near the target track, i.e., a track-following process is started, as shown in step S10 in FIG. 6.

In this track-following process, whether or not the relative speed is equal to or lower than a track-following possible speed (e.g., 18 mm/s or less) is determined first based on the relative speed detect signal S3 by a speed comparing section 30 (FIG. 7) that receives the relative speed detect signal S3 in step S11. Upon controlling to the track-following possible speed, the lens actuator 24 is controlled on the basis of the tracking actuator command S5 to control the moving speed of the light beam spot toward the track-following possible speed.

When the light beam spot has reached the track-following possible speed, a CAPA detecting section 32, which receives a tracking error signal and responds to a component corresponding to the CAPA in that signal, is activated by an activation signal from the speed comparing section 30 in step S12. The CAPA detecting section 32 generates a CAPA detect signal 0.1 ms after it is detected that the beam spot has passed the CAPA. Generation of the CAPA detect signal corresponds to detection of the CAPA, as shown in step S13, and whether or not the CAPA is detected is determined by checking if this signal is generated.

This CAPA detect signal is input to a track-following signal generating section 34, which waits for passing of a CAPA, as shown in step S14, in response to this CAPA detect signal, and then starts detection of the track-following start phase, as shown in step S15. More specifically, a zero-crossing detecting section 36 that receives the tracking error signal detects zero-crossing points in turn, and supplies zero-crossing signals to the track-following signal generating section 34 every time a zero-crossing point is detected. The track-following signal generating section 34 waits for a zero-crossing signal input after a CAPA detect signal, i.e., waits until the start phase has been reached, as shown in step S16, and then generates a track-following signal.

If a CAPA is detected during the track-following process, a problem of poor response is posed, but the track-following shift timing is preferably set at the zero-crossing timing of a tracking error (TE) signal within 0.4 ms after passing of a CAPA. This timing is not limited to the zero-crossing timing of the tracking error (TE) signal, but may be set at a given phase of a tracking error (TE) pseudo sine wave. However, since a phase can be accurately detected at the zero-crossing timing of the tracking error (TE) signal in practice, the shift timing is set at the zero-crossing timing of the tracking error (TE) signal corresponding to a 0 or 180° phase. The reason why the shift timing is set after passing of a CAPA and preferably within 0.4 ms is to avoid tracking-servo failure servo due to a CAPA before the tracking-servo is settled. Since the CAPA period of a 4.7 GB DVD-RAM is approximately 0.7 ms, and encounter with a CAPA must be prevented for around 0.3 ms after the beginning of the track-following process, the shift timing is set within 0.4 ms. In practice, the shift timing is set immediately after passing of a CAPA or within a two-cycle movement period of a tracking error signal (tracking error signal (T SUB)) after passing of a CAPA.

Note that the CAPA passing time is constant if a desired linear velocity has been reached at the target track. However, if a required rotational speed has not been reached due to an insufficient driving force of a disc rotation system, the CAPA passing time varies. The delay time of a delay device is set in consideration of the longest CAPA passing time.

In the system shown in FIG. 2, the track-following signal is input to a track-following controlling section 38 that receives the tracking error signal, and brake control starts, as shown in step S17. This brake control is accomplished in a manner that a controlled variable u is supplied as a tracking actuator command S5 to the tracking actuator current amplifier 15, and the lens actuator 24 is driven by a current signal from the tracking actuator current amplifier 15.

When the brake control has started, and the light beam spot has reached an on-track state, normal tracking-servo starts, as shown in step S18, and the track-following process ends, as shown in step S19.

Figure 8:
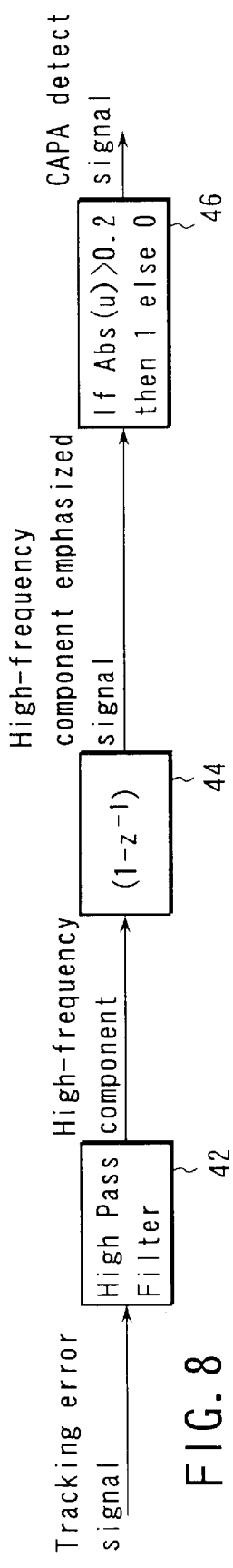
FIG. 8 is a functional block diagram showing a CAPA detecting section 32 shown in FIG. 7.
Figure 9:
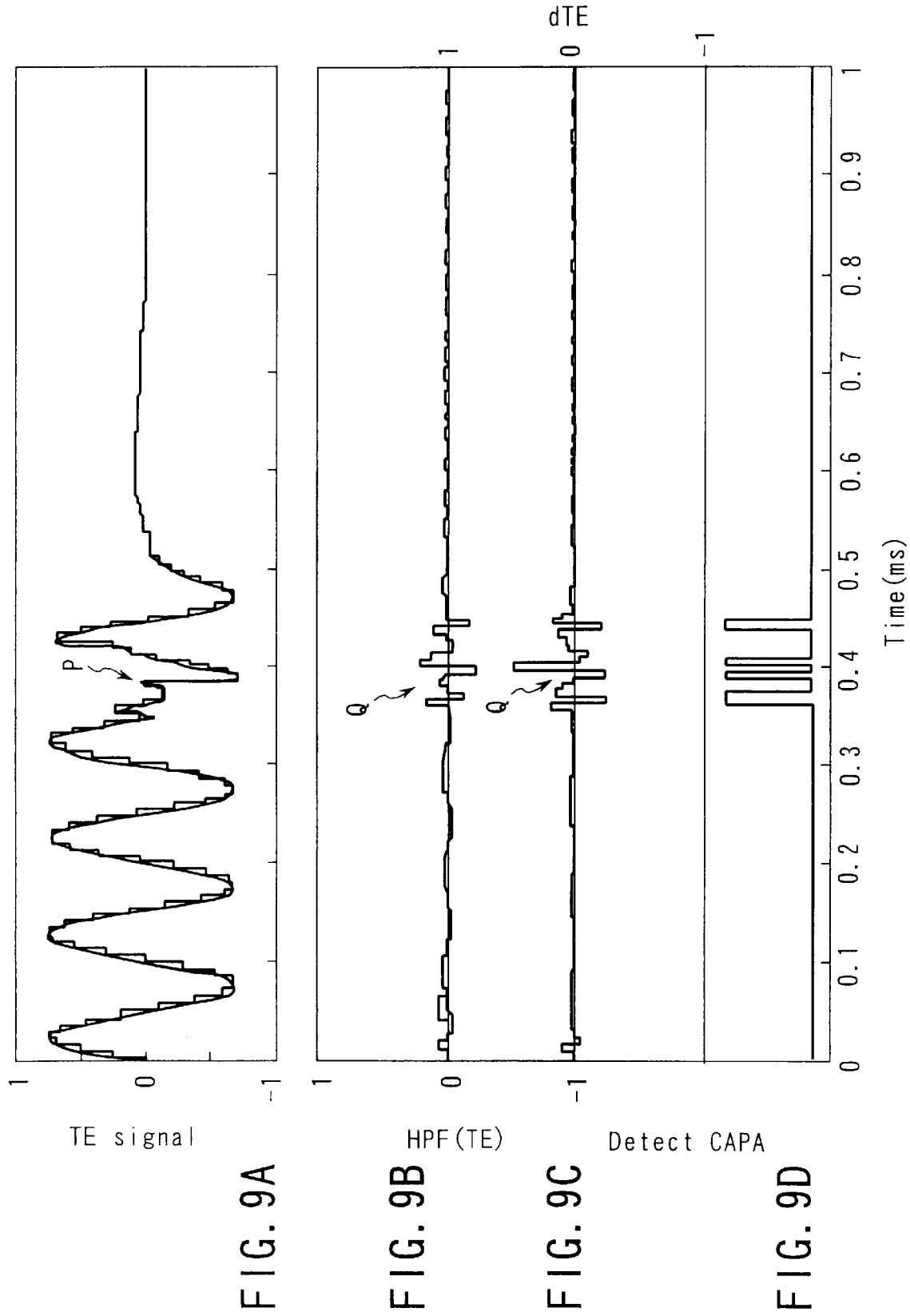
FIG. 9A is a waveform chart showing a tracking error signal which is input to a high-frequency filter shown in FIG. 8 and is obtained by digital sampling.
FIG. 9B is a waveform chart showing a high-frequency component output from the high-frequency filter shown in FIG. 8.
FIG. 9C is a waveform chart showing the output from a high-frequency component emphasis section shown in FIG. 8.
FIG. 9D is a waveform chart showing a CAPA detect signal output from a comparing section shown in FIG. 8.

The CAPA detecting section 32 shown in FIG. 7 comprises circuit functional blocks shown in, e.g., FIG. 8. More specifically, the CAPA detecting section 32 comprises a high-pass filter 42 that passes only a high-frequency component in the tracking error signal, as shown in FIG. 8. A tracking error signal S4 undergoes digital sampling when it is input to the control and processing section (DSP) 20, and is converted into a digital tracking error signal S4 shown in FIG. 9A. This digital tracking signal S4 contains a high-frequency signal component Q corresponding to a CAPA. When the tracking error signal S4 is input to the high-pass filter 42, the high-frequency signal component Q corresponding to a CAPA is extracted, as shown in FIG. 9B. At this time, since the speed upon detecting the CAPA becomes low to some extent, as described above, a basic pseudo sine wave component is removed from the tracking error signal (T SUB signal) by the high-pass filter 42. For example, a 25-kHz second-order Butterworth high-pass filter is used.

The high-frequency component (HPF-TE) Q output from this filter 42 is input to a differential processing section (derivative processing section) 44, and is emphasized by the differential processing section 44, as shown in FIG. 9C. The emphasized high-frequency component (HPF-TE) Q is compared with a given threshold value (e.g., absolute value >0.2 or more) by a comparing section 46. If that high-frequency component is equal to or higher than the threshold value, a CAPA detect signal ("1") is output sequentially, as shown in FIG. 9D. In the comparing section 46, if the emphasized high-frequency component (HPF-TE) Q is smaller than the threshold value (e.g., absolute value >0.2 or more), it is determined that no CAPA is detected, and a CAPA non-detect signal ("0") is output.

In the example shown in FIGS. 9A to 9D, the CAPA period can be completely detected from its start to end. However, in practice, the amplitude of a tracking error signal (T SUB signal) differs depending on whether or not a signal is recorded, and the CAPA period cannot be reliably detected from its start to end based on, e.g., the start phase of the CAPA. However, pulses shown in FIG. 9D rise at least somewhere in the CAPA period, and the CAPA can be detected.

Note that the CAPA detection method in step S13 is not limited to the functional blocks shown in FIG. 8, but may be achieved by other methods. Since the CAPA detection cannot always detect the entire CAPA period, the start or end timing of the CAPA, or the like, but merely detect an arbitrary portion of the CAPA, a CAPA passing wait process for a predetermined period of time is executed after detection of the CAPA, as described in step S14. In this specification, the CAPA passing timing is not an actual CAPA passing timing, but is merely an arbitrary timing within a predetermined period of time after passing of the CAPA, and that timing is set as the CAPA passing timing. In the above embodiment, the CAPA passing timing is set 0.1 ms after passing of the CAPA, and a CAPA detect signal is generated at that timing.

In the aforementioned embodiment, after passing of the CAPA is confirmed, a true track-following start timing is detected to drive the lens actuator in step S16. This is because the phase of the tracking error signal (T SUB signal) that encounters the CAPA is unknown, and track-following stability impairs if the track-following process is executed immediately after passing of the CAPA. Basically, the track-following start phase is not particularly limited as long as the sine wave phase of the tracking error signal of the track-following process is determined. In the above embodiment, the track-following process is started at a −180° phase (zero-crossing point where the tracking error signal shifts from positive to negative) that can be easily detected.

Figure 5:
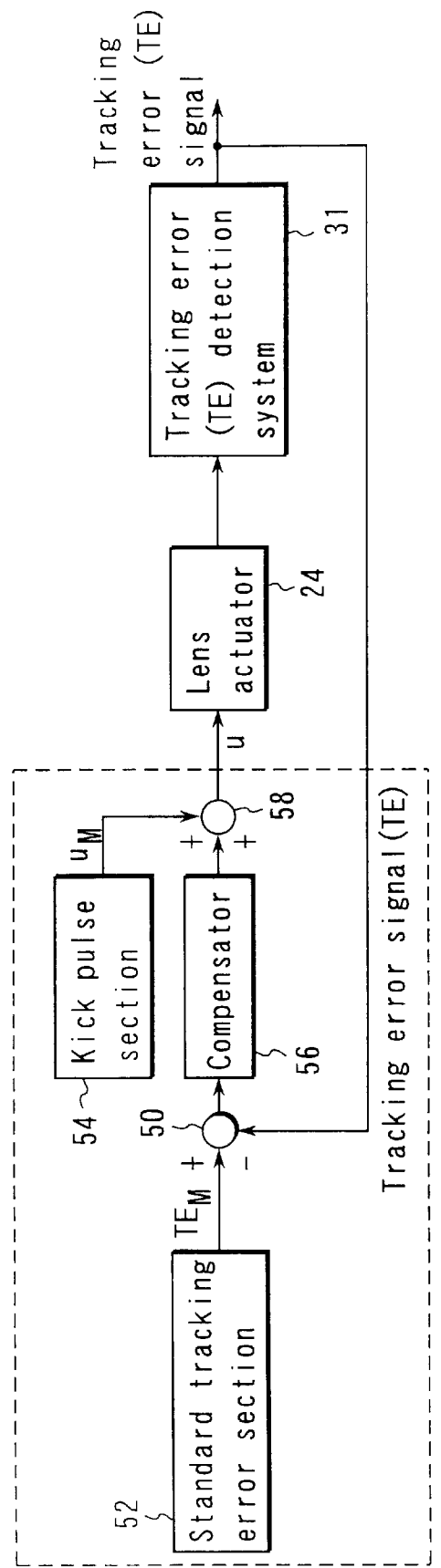
FIG. 5 is a control block diagram for implementing a track-following control system in a control and processing section of the optical disc apparatus shown in FIG. 2.

The brake control will be described in more detail below with reference to FIG. 5. As shown in step S17, as the brake control the tracking actuator command S5 having the controlled variable u is supplied to the tracking actuator current amplifier 15. As shown in FIG. 5, the brake control system comprises a standard tracking error section 52 for generating a standard tracking error signal ($TE_M$), an adder 50 for outputting the difference between this standard tracking error signal ($TE_M$) and a tracking error signal (TE), a compensator 56 for compensating this difference output, a kick pulse section 54 for generating a kick pulse $U_M$, and an adder 58 for adding the output from the compensator 56 and the kick pulse $U_M$.

Figure 10:
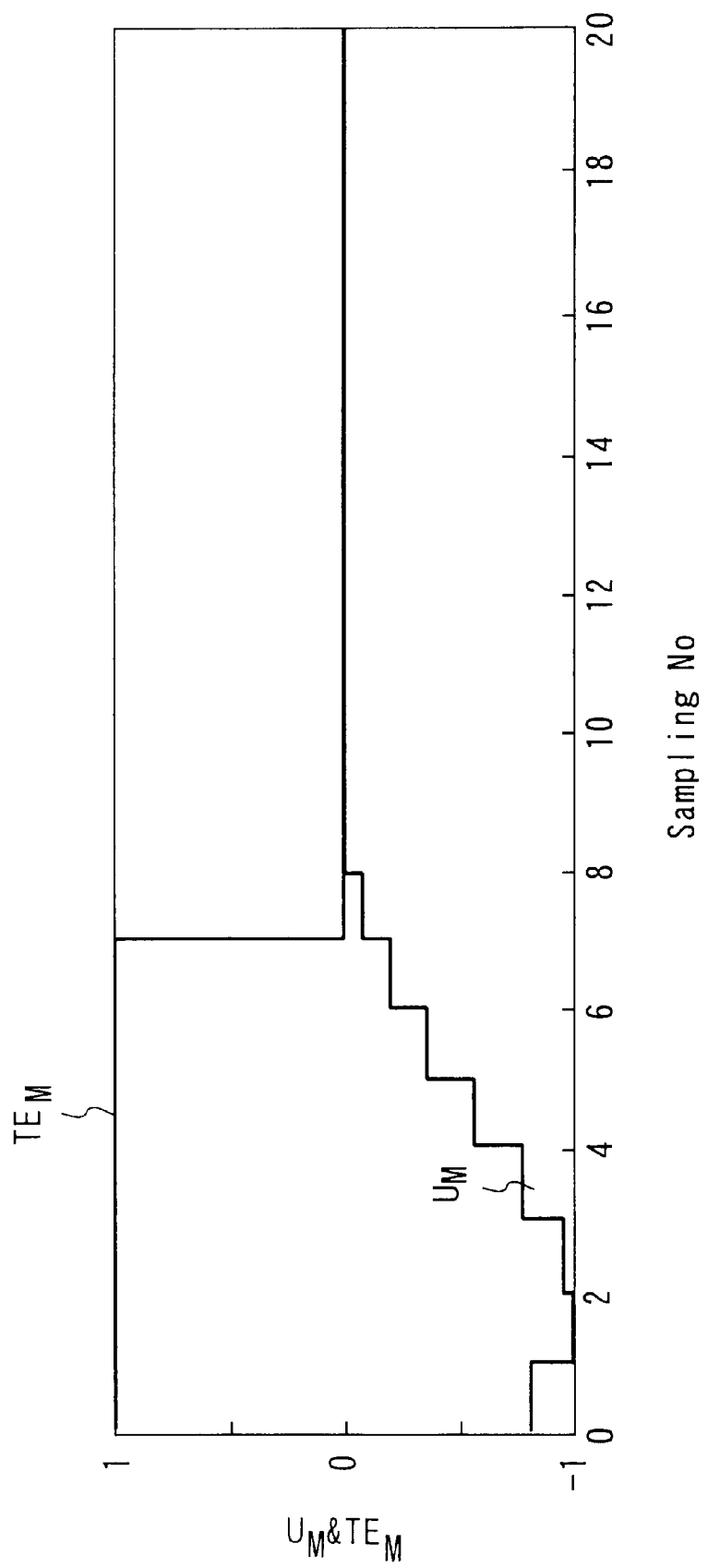
FIG. 10 is a graph that defines output signals which change with time and are output from a standard TE section and kick pulse section shown in FIG. 5.
Figure 11A:
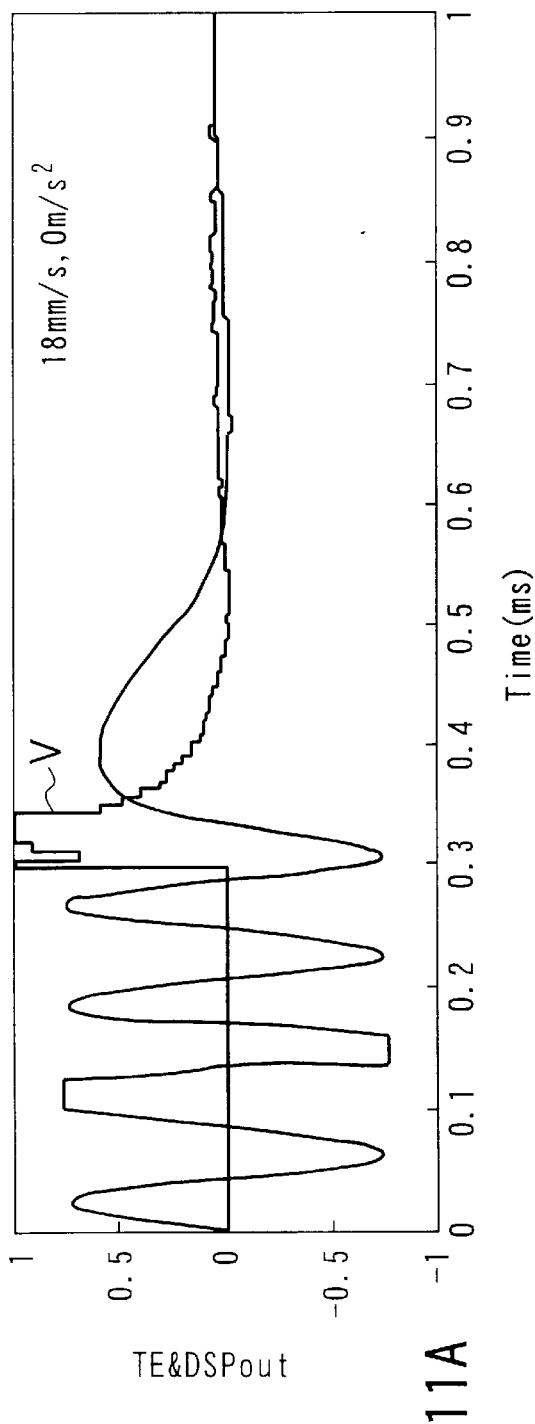
FIGS. 11A and 11B are graphs showing the relationship between a tracking actuator command S5 (DSPout in the graphs) having a controlled variable u, and a tracking error (TE) when the thrust speed of an objective lens has changed to 18 mm/s and 15 mm/s in a track-following control system shown in FIG. 7.
Figure 11B:
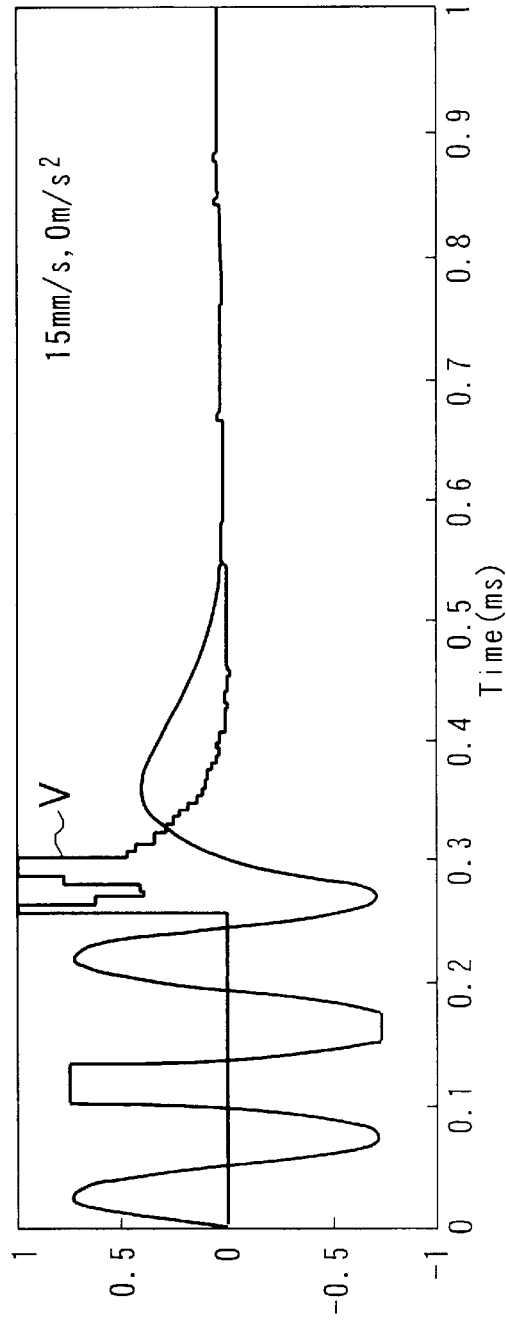

The standard tracking error section 52 has a memory (not shown), which stores a table shown in FIG. 10, and generates a standard tracking error signal based on this table. The table of the standard tracking error signal (TE) summarizes desired standard tracking error (TE) responses for seven sampling periods (sampling Nos. 0 to 7) when the track-following process is started nearly at an ideal thrust speed in the form of a table. As can be seen from FIG. 10, standard tracking error (TE) responses $TE_M$ of sampling Nos. 0 to 7 are "1", but those after sampling No. 7 are "0". A tracking error signal is sampled in response to the track-following signal. Simultaneously with this sampling, a standard tracking error (TE) response $TE_M$ is extracted from the table shown in FIG. 10, and the standard tracking error section 52 generates an output tracking error ($TE_M$) on the basis of this standard tracking error (TE) response $TE_M$. Therefore, the standard tracking error section 52 updates the output tracking error ($TE_M$) every time a given time elapses, and outputs the updated standard tracking error ($TE_M$).

Likewise, as shown in FIG. 10, an appropriate deceleration input sequence is stored in a memory as a table, and the kick pulse $U_M$ is generated by the kick pulse section 54 based on this table. This kick pulse $U_M$ is updated at every sampling, i.e., every time a given time elapses in the same manner as the standard tracking error (TE) response $TE_M$.

The compensator 56 compensates by giving a certain compensation gain to the difference between the actual tracking error (TE) and standard tracking error ($TE_M$), and its output is added to the kick pulse $U_M$ by the adder 58, thus outputting the sum as a current command u.

When a current command value u to the lens actuator 24 considers the kick pulse $U_M$ and the correction output from the compensator 56, a system of the compensator 56 and kick pulse unit 54 is described by:

Current command: $u = gp(1 - d1z^{-1})[TE_M - TE] + U_M$ where gp is a proportional gain, d1 is a parameter, and $z^{-1}$ is a delay operator.

As described above, in the track-following process which is started by driving the lens by the lens actuator 24, tracking-servo is started after the relative speed is sufficiently decelerated by supplying brake pulses to the lens actuator in place of being started immediately. In the aforementioned embodiment, adaptive brake control is used as the relative speed deceleration method. In this embodiment, the adaptive brake period has a fixed duration of around 50 is corresponding to seven sampling periods.

FIGS. 11A and 11B, and FIGS. 12A and 12B show the time responses of the tracking actuator command S5 (DSPout in the graphs) having a controlled variable u denoted by symbol V, and a tracking error (TE) when the thrust speed of the objective lens 21 is changed to 18 mm/s, 15 mm/s, 12 mm/s, and 9 mm/s. If the tracking error (TE) and standard tracking error ($TE_M$) exactly match, the current command value u to the lens actuator equals the kick pulse $U_M$. However, if these errors have a difference, the current command value u is increased/decreased to vary the deceleration acceleration, and tracking-servo is started after approximately zero speed is set. In this way, a track-following process invulnerable to speed variations can be implemented by the adaptive brake control.

As described above, since the track-following start timing of the lens actuator is detected after passing of a CAPA is confirmed, the CAPA can be prevented from being erroneously detected as the track-following start timing or stability can be prevented from being disturbed due to encounter with a CAPA during the track-following process.

Figure 13:
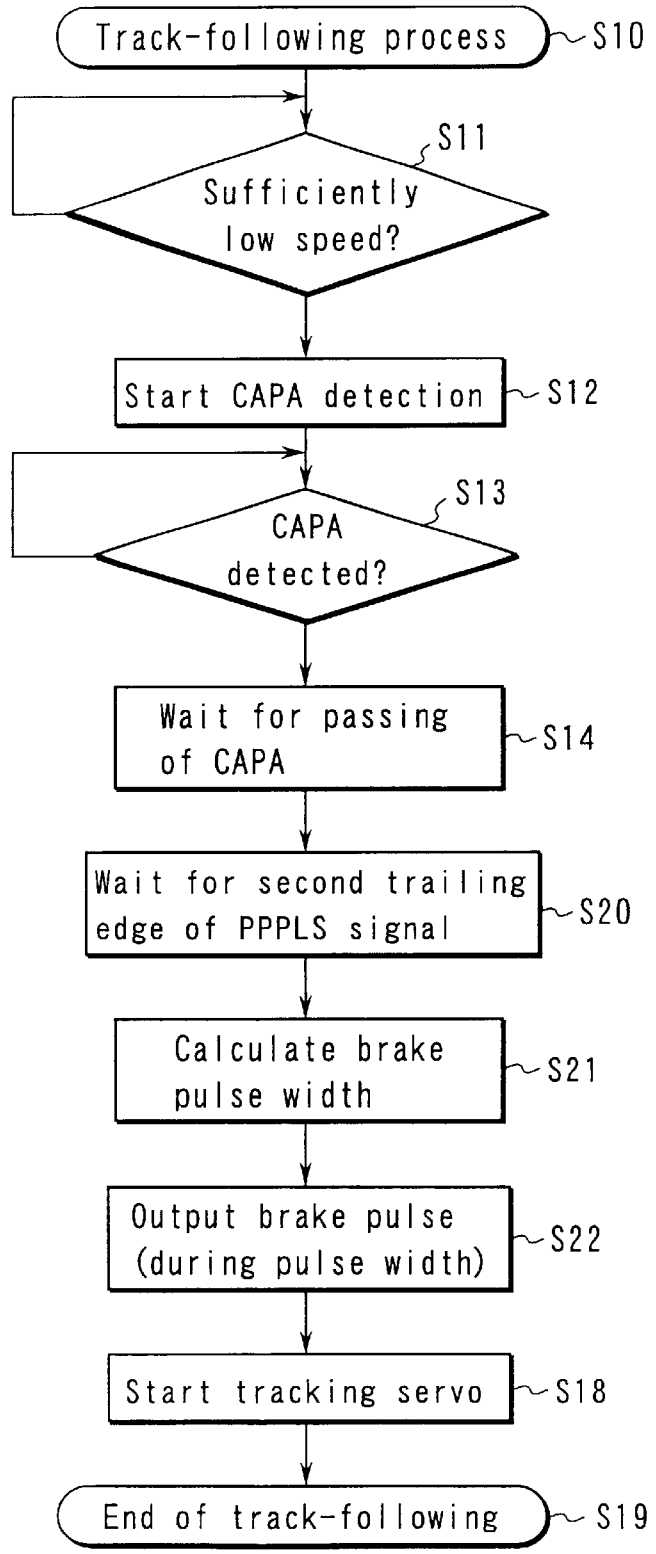
FIG. 13 is a flow chart showing another embodiment of track-following control executed by the control and processing section of the optical disc apparatus shown in FIG. 2.

Another embodiment of a track-following process will be described below with reference to FIGS. 13 and 14. In FIG. 13, the same step numbers denote the same steps as in FIG. 6, and a detailed description thereof will be omitted. Also, in FIG. 14, the same reference numerals denote the same functional blocks as in FIG. 7, and a detailed description thereof will be omitted.

Figure 14:
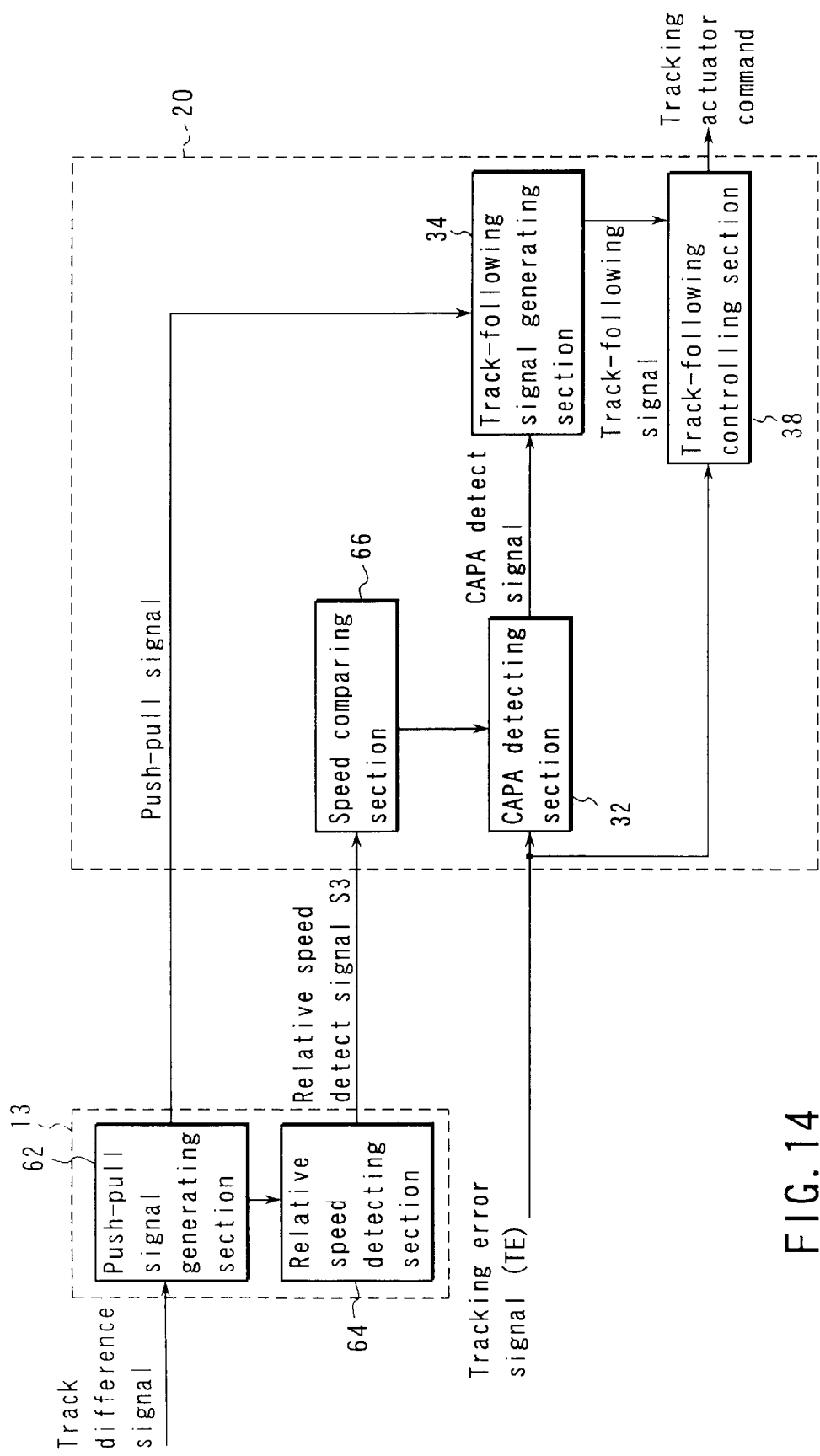
FIG. 14 is a block diagram for explaining functions for track-following control implemented by the control and processing section of the optical disc apparatus shown in FIG. 2 according to another embodiment of the present invention.

The track-following process in FIGS. 13 and 14 is basically the same as that based on detection of the CAPA as in the above embodiment, except that the track-following start timing after detection of the CAPA is not a tracking error (TE) zero-crossing point of the track-following phase immediately after passing of a CAPA but that after two zero-crossing points of the tracking error signal are detected after passing of a CAPA, and the track-following process by the lens actuator adopts a scheme for starting tracking-servo after the lens is decelerated by open brake pulses. Since this embodiment is basically the same as the first embodiment, a description until detection of passing of a CAPA will be omitted in FIG. 13, and a process after passing of the CAPA will be explained.

Upon detecting a relative speed by the relative speed detecting and processing circuit 13, a push-pull pulse signal generating circuit 62 binarizes a tracking error signal (TE) to obtain pulses, and generates a push-pull pulse (PPPLS) signal. The push-pull pulse (PPPLS) signal is supplied to a relative speed detecting section 64, which counts between the trailing and leading edges of the push-pull pulse (PPPLS) signal in synchronism with reference clocks, calculates a relative speed based on the reciprocal of the count value, and outputs it as a relative speed detect signal S3. Therefore, the relative speed detecting and processing circuit 13 may erroneously detect the moving speed of the light beam upon passing of a CAPA due to its detection principle.

To avoid such detection error, a process for "waiting for the second trailing edge" of the push-pull pulse (PPPLS) signal is executed, as shown in step S20. Note that the trailing edge of the push-pull pulse (PPPLS) signal is equivalent to the zero-crossing timing of the tracking error (TE) that changes from positive to negative, i.e., the track-following start phase, and the second trailing edge indicates the track-following start phase timing after a pseudo sine wave of the difference signal passed at least one period after passing of a CAPA. In the process for "waiting for the second trailing edge", after the CAPA detecting circuit 32 generates a CAPA detect signal upon passing of a CAPA, the push-pull pulse (PPPLS) signal is detected by the center-lead signal generating section 34, and the zero-crossing timing of a tracking error (TE) obtained under the nearly stable speed control after the edge of the push-pull pulse (PPPLS) signal has been detected a plurality of number of times (twice in this embodiment), i.e., the third edge since the start of detection (corresponding to the second trailing edge since the start of detection) is set at the track-following start timing. Upon detecting this trailing edge, the zero-crossing timing of a tracking error (TE) which changes from positive to negative, i.e., the track-following start phase is detected.

In this way, since the edge of the push-pull pulse (PPPLS) signal is detected a plurality of number of times (twice in this embodiment), speed control is made based on the two or more accurately detected speeds, and relative speed variations at the beginning the track-following operation by the lens actuator 24 can be minimized.

As shown in step S21, the relative speed is decelerated by open brake pulses in place of adaptive brake control after the track-following process is started. Since the detected relative speed is updated at the trailing edge timing of the push-pull pulse (PPPLS) signal upon determining the start of the process, the brake pulse width (corresponding to the brake output time, i.e., a period from the beginning of the track-following operation until the start of tracking-servo) is calculated based on the updated relative speed, the track-following controlling circuit generates a tracking actuator signal having this brake pulse width as a brake signal, thus braking the objective lens 21. If n represents the number of times of sampling during the deceleration period, the brake pulse width is defined by:

Number n of times of sampling during deceleration period:

$$n=INT(a \times Vo/Ts)$$

where Vo is the thrust speed, Ts is the control period, and Ts is a coefficient obtained based on the reciprocal of an acceleration generated in correspondence with the maximum command input to the lens actuator 24. At a normal thrust speed of about 15 mm/s, deceleration is made by maximum outputs during seven sampling periods. At a lower thrust speed, the brake pulse interval becomes short, and the relative speed upon starting tracking-servo becomes approximately zero, thus allowing a stable track-following process.

In this embodiment, the track-following start timing is set at the second trailing edge timing. The purpose of CAPA synchronization is to prevent a CAPA from appearing before the tracking-servo is settled. Hence, the track-following start timing may be set at an arbitrary timing as long as the track-following process can be started within 0.4 ms after passing of a CAPA.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of guiding an optical beam on a target track on an optical disc having lands and grooves defining tracks, each of the tracks including sectors having header regions in which pre-pits are formed, comprising:

moving the light beam in a direction to cross the tracks to seek the target track on the optical disc;

detecting the light beam reflected from the optical disc to generate a tracking error signal having zero-crossing points;

detecting the pre-pits from the tracking error signal, and detecting a predetermined one of the zero-crossing points after the detection of the pre-pits to generate a start signal; and starting tracking-servo in response to the start signal to guide the optical beam on the target track in accordance with the tracking error signal.

2. A method according to claim 1, wherein the predetermined one of the zero-crossing points is detected within a two-cycle period of the tracking error signal after detection of the pre-pits.

3. A method according to claim 1, wherein the predetermined one of the zero-crossing points is detected within 0.4 ms after detection of the pre-pits.

4. A method according to claim 1, wherein the start signal is generated in response to a first one of the zero-crossing points after two zero-crossing points of the tracking error signal are detected after detection of the pre-pits, the first one of the zero-crossing points corresponding to the predetermined one of the zero-crossing points.

5. A method according to claim 1, wherein the starting of the tracking-servo includes applying a braking force to the light beam and decelerating the light beam to a predetermined moving speed in response to detection of the predetermined zero-crossing point, and guiding the light beam to the target track.

6. A method according to claim 5, wherein the applying the braking force includes:

generating a standard tracking error signal;

applying a compensating gain to a difference between the standard tracking error signal and the detected tracking error signal to generate a compensating signal;

generating a kick pulse signal and adding the kick pulse signal to the compensating signal to output a decelerating signal; and producing the braking force in accordance with the decelerating signal.

7. A method according to claim 1, wherein the starting of the tracking-servo includes applying a braking force by using an open brake pulse to the light beam in response to the predetermined one of the zero-cross points, which corresponds to the start signal, and decelerating the light beam to a predetermined moving speed, and guiding the light beam to the target track.

8. A method according to claim 1, wherein the detecting of the pre-pits includes extracting a high-frequency component from the tracking error signal, emphasizing the extracted high-frequency component, comparing the emphasized high-frequency component with a threshold value to generate a discrimination signal, and setting a timing of detecting the pre-pits a predetermined time period after the generation of the discrimination signal.

9. An optical disc apparatus configured to guide an optical beam on a target track on an optical disc having lands and grooves defining tracks, each of the tracks including sectors having header regions in which pre-pits are formed comprising:

a focusing lens configured to focus the light beam on the optical disc;

moving mechanism configured to move the focusing lens and shift the light beam in a direction to cross the tracks to seek a target track on an optical disc;

detecting circuit configured to detect the light beam reflected from the optical disc to generate a tracking error signal having zero-crossing points;

pre-pit detecting circuit configure to detect the pre-pits from the tracking error signal, and detecting a predetermined one of the zero-crossing points after the detection of the pre-pits to generate a start signal; and track-servo controller configured to start tracking-servo in response to the start signal to guide the optical beam on the target track in accordance with the tracking error signal.

10. An apparatus according to claim 9, wherein the pre-pit detecting circuit detects predetermined one of the zero-crossing points within a two-cycle period of the tracking error signal after detection of the pre-pits.

11. An apparatus according to claim 9, wherein the start signal is generated in response to a first one of the zero-crossing points after two zero-crossing points of the tracking error signal are detected after detection of the pre-pits, the first one of the zero-crossing points corresponding to the predetermined one of the zero-crossing points.

12. An apparatus according to claim 9, wherein the predetermined one of the zero-crossing points is detected within 0.4 ms after detection of the pre-pits.

13. An apparatus according to claim 9, wherein the track-servo controller includes a brake controller configured to apply a braking force to the focusing lens and decelerate the focusing lens to a predetermined moving speed in response to detection of the predetermined zero-crossing point, and guide the light beam to the target track.

14. An apparatus according to claim 9, wherein the break controller includes:

a first generating section configured to generate a standard tracking error signal;

a first adder configured to output a difference between the standard tracking error signal and the detected tracking error signal;

a compensator configured to apply a compensating gain to the difference output from the first adder to generate a compensating signal;

a second generating section configured to generate a kick pulse signal;

a second adder configured to add the kick pulse signal to the compensating signal to output a decelerating signal which produces the braking force.

15. An apparatus according to claim 9, wherein the track-servo controller includes a brake controller configured to apply a braking force by using an open break pulse to the focusing lens in response to the predetermined one of the zero-cross points, which corresponds to the start signal, and decelerate the focusing lens to a predetermined moving speed and guide the light beam to the target track.

16. An apparatus according to claim 9, wherein the pre-pit detecting circuit comprises a high-pass filter configured to extract a high-frequency component from a tracking error signal upon detecting the pre-pits, an emphasis processing section configured to emphasize the extracted high-frequency component, and a discriminating section configured to compare the emphasized high-frequency component with a threshold value to generate a discrimination signal, and a timing setting section configured to set a timing of detecting the pre-pits a predetermined time period after the generation of the discrimination signal.

* * * * *